UNITED STATES PATENT OFFICE.

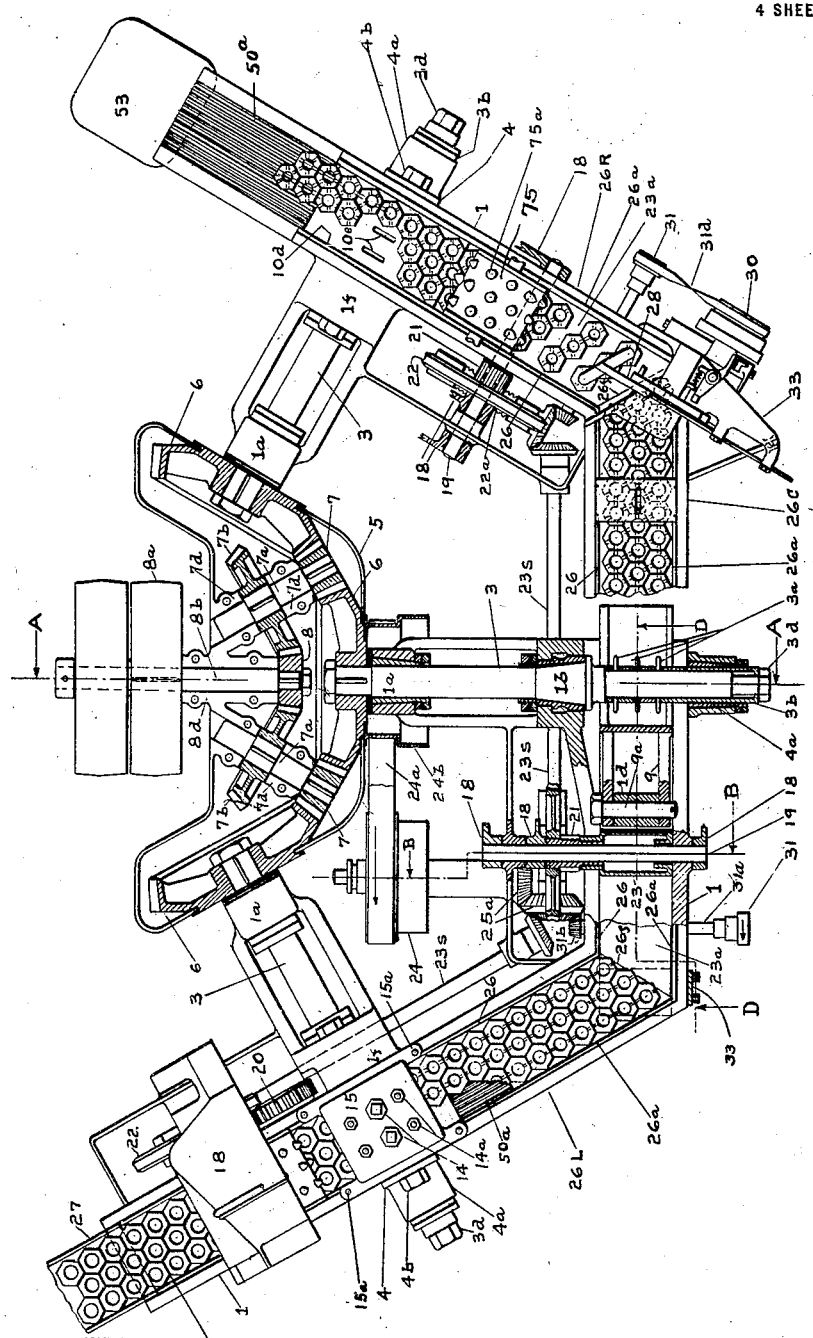

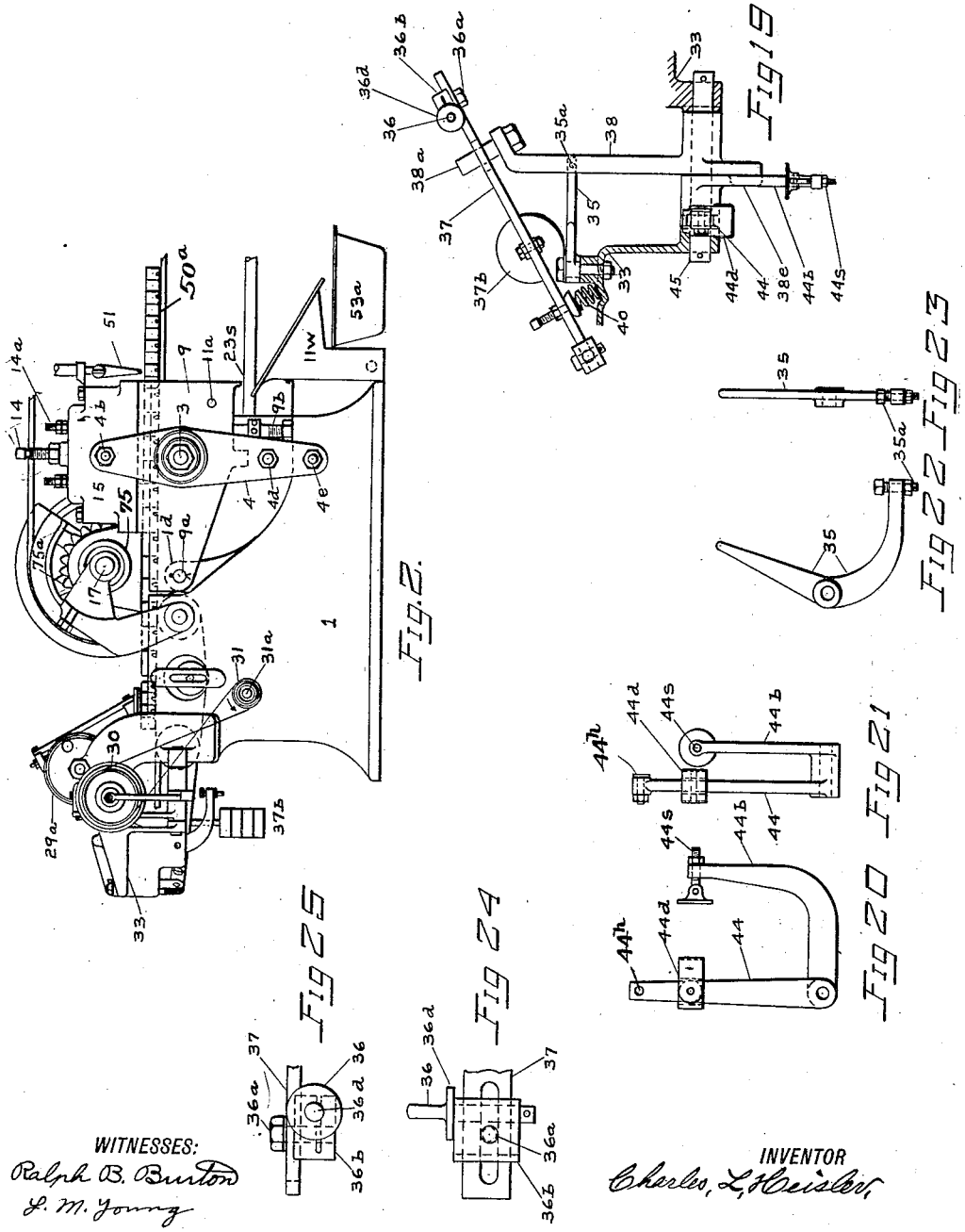

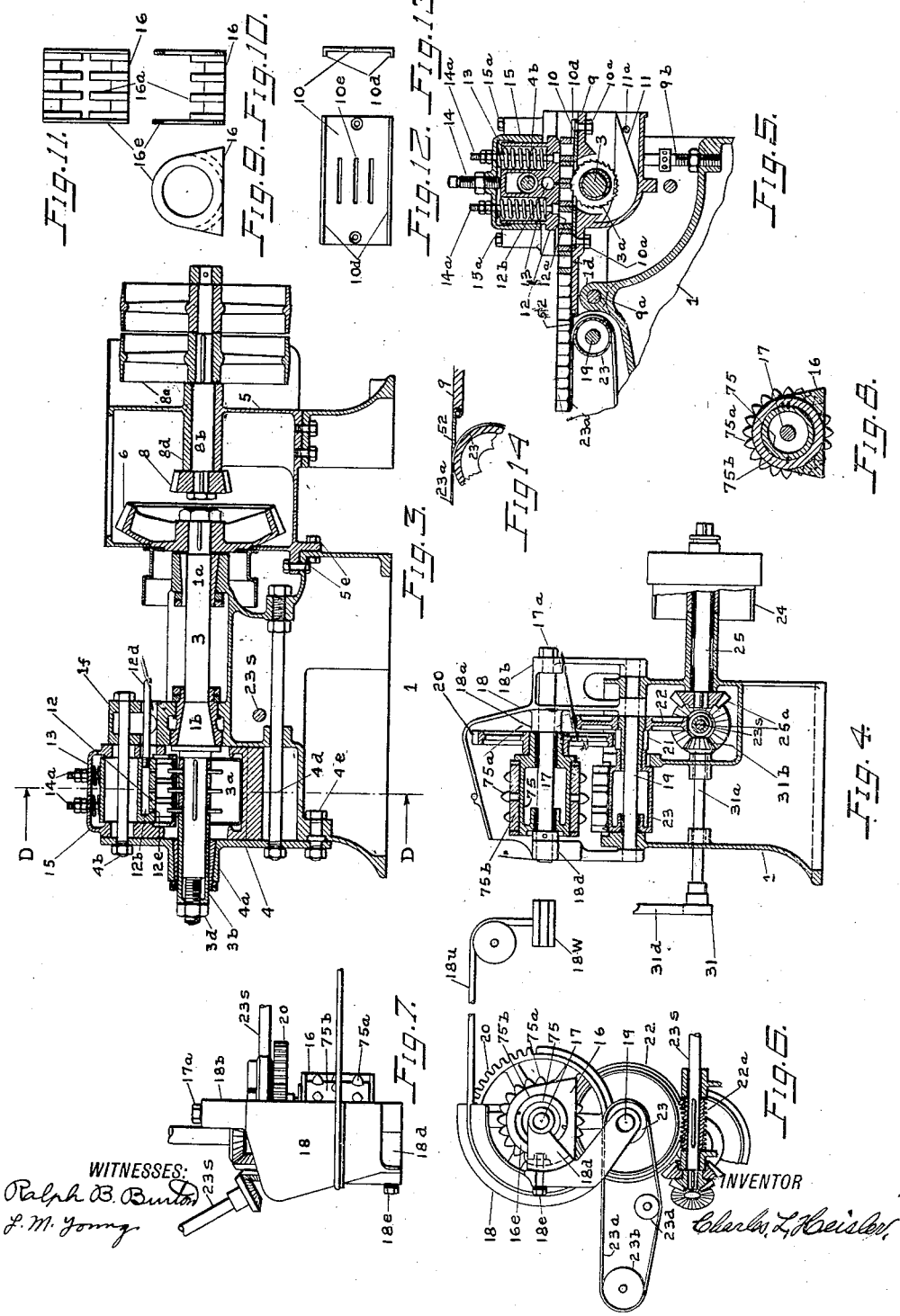

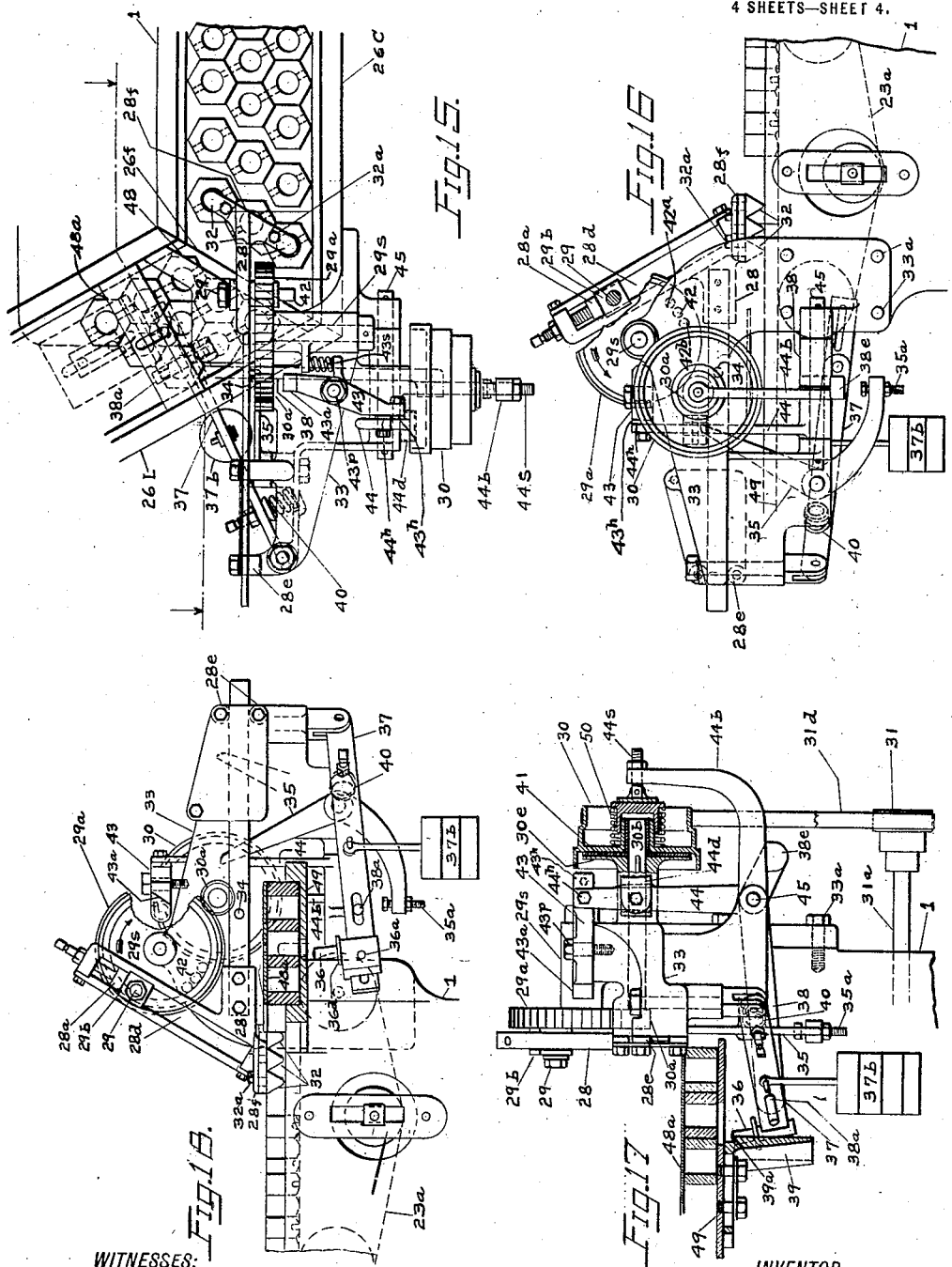

CHARLES L. HEISLER, OF SCHENECTADY, NEW YORK.

NUT-SLOTTING MACHINE.

1,321,370.   Specification of Letters Patent.   Patented Nov. 11, 1919.

Application filed October 27, 1916. Serial No. 128,130.

*To all whom it may concern:*

Be it known that I, CHARLES L. HEISLER, of Schenectady, in the county of Schenectady and State of New York, have invented a certain new and useful Improvement in Nut-Slotting Machines, of which improvement the following is a specification.

My invention relates more particularly to a machine for milling cotter slots, at different angles with respect to each other and across the outer faces of hexagon or crown nuts for the purpose of providing recesses for nut locking cotters.

Its objects are to provide an improved process of feeding nuts by automatic means in a continuous stream into proper cutting engagement with a gang of milling cutters and which thereafter automatically re-arranges the nuts and again feeds them through a second and third gang of cutters, each time at an angle corresponding to that of the wrench facets formed on the nuts and in a manner so as to properly form slotted or castellated nuts; to feed the nuts so as to avoid forming burs on the facets at the bottom of the slots when using dulled milling cutters; to provide a process and means for separating the chips and water from the nuts, thereby cleaning and drying them after they are milled; to provide safety power feeds which automatically lift out of engagement with the nuts when their resistance to the feed motion is much greater than would be required when the cutters are milling under normal conditions, and to provide for an efficient rearrangement of the nuts after each cutting operation, by automatic means, whereby the movement of the nut stream is turned through an angle and started in a direction corresponding to a new path of motion after leaving a gang of milling cutters and before coming into cutting engagement with the following gang of cutters.

In the drawings forming part of this specification, Figure 1 is a plan view of three milling machine sections forming my invention, and wherein some parts are removed and others taken in section for the purpose of illustration; Fig. 2, a side elevation of one of the sections; Fig. 3, a sectional elevation of one of the sections taken on the vertical plane indicated by the darts A A, of Fig. 1; Fig. 4, a sectional elevation taken on the plane B B; Fig. 5, a sectional elevation taken on the plane D D; Fig. 6, a detail elevation of the power nut feed gear and nut conveyer; Fig. 7, a plan view thereof; Fig. 8, a transverse section of a nut pin feed roller and guard; Figs. 9, 10 and 11, end, side and plan views of the roller guard; Figs. 12 and 13, plan and end views of a slotted milling table top; Fig. 14, a sectional detail illustrating a bridge formed between a nut conveyer and milling table; Figs. 15, 16, 17 and 18, are respectively, a plan, a front side elevation, an end elevation, with parts broken away, and a rear side elevation of automatic means for feeding nuts and changing their direction of motion as they pass in a stream from one milling machine section to the other; Fig. 19, a detail plan view showing the arrangement of levers forming part of the automatic feeding means; Figs. 20, 21, 22 and 23, are details of the levers; Figs. 24 and 25, a side and plan view of a nut trip pin forming part of the automatic feeding means.

In the drawings, the three milling machine bases 1, are of like construction and each provide journal bearings $1^a$ and $1^b$, which support the milling cutter spindles 3. These spindles are each adapted to support and rotate a gang of milling cutters $3^a$, which are of usual construction and therefore will not be described. A cutter clamping cupped sleeve $3^b$, is secured to the spindle by the nut $3^d$, in a manner to securely fasten the gang of cutters and also form a journal which is supported in the bearing $4^a$, formed in the clamping bar 4. This bar is rigidly fastened to the base 1, by means of the clamp bolts $4^b$, $4^d$ and $4^e$.

The three cutter spindles, two outer and one central, are driven by a train of beveled gears disposed within the gear box 5, from which the spindles protrude radially, in a horizontal plane and at a relative angle of 60° with each other, corresponding to the angles formed by the wrench facets of hexagon nuts, or at an angle corresponding to that desired when milling other objects on the machine. The three bevel gears 6, are each secured to the corresponding cutter spindle in usual manner and are driven by the pair of intermediate bevel pinions 7, which are interposed as illustrated, between the outer gears and the central spindle gear. The pair of pinions are each fastened to an intermediate gear shaft $7^a$, which has an intermediate gear $7^b$, secured thereto. The pair of intermediate gears $7^b$, are driven by a single interposed driving pinion 8, which is fastened to the driving pulley $8^a$, by the driving shaft $8^b$. The shafts $7^a$ and $8^b$, are supported in the journal bearings $7^d$ and $8^d$, which are formed in the box 5. The shafts $7^a$, are disposed at an angle of 60° with each other and at an angle of 30° with the driving shaft $8^b$. This shaft $8^b$, is disposed in axial alinement with the central cutter spindle and at an angle of 60° with the outer pair of cutter spindles. By this compact arrangement of inclosed gears, power is transmitted to the milling cutters in a simple and efficient manner. The gear box 5, is fastened to each of the bases 1, by the bolts $5^e$, so as to support and hold the box and gears in accurate alinement therewith.

The vertically adjustable and slotted nut milling table or race section 9 is provided with a removable race section or top 10, and is pivotally supported at one end on the base. It is secured thereto by the hinge pin $9^a$, which pierces the base lug $1^d$, disposed at the hinged end of the table. The vertical adjusting bolt $9^b$, raises or lowers the table to compensate for cutter wear to determine the depth of the slots or for convenience when removing the cutters. The slotted table top or nut race 10 is secured by the bolts $10^a$, to form a removable top for the table and through which the upper teeth of the cutters project a sufficient and predetermined adjustable distance corresponding to the desired depth of the cotter slots which are to be formed in the nuts. The nuts are guided into proper cutting engagement with the cutters by the flanges $10^d$, formed on the slotted nut race. The spacing between the slots $10^e$, and the width between the flanges of this race, are governed by the sizes of the nuts. Three slots are shown because practice teaches this to be the most desirable number. Evidently, a greater, or lesser, number may be used to suit the desired number of rows of nuts which may be fed over the cutters at the same time. A water and chip pan 11, is disposed directly under the cutters and within the housing formed in the table 9, so as to cause the chips and cooling water to be discharged from beneath the cutters and to keep the lower teeth of the cutters submerged in the cooling liquid. This pan is positioned within the housing by the pin $11^a$.

The stream of nuts is held downward in sliding contact with the slotted table top 10, and in proper cutting engagement with the cutters, by the vertically adjustable shoe 12. This shoe has a horizontally disposed wear face $12^a$, which is in sliding contact with the nuts. The pressure exerted upon the stream of nuts can be governed by the shoe springs 13, and the vertical adjusting screws 14 and $14^a$, which project downward into the shoe and spring housing 15. This shoe housing is rigidly fastened to the table by the bolts $15^a$, and is clamped between the bar 4 and the upwardly projecting bracket $1^f$, formed on the base, by the bolt $4^b$. The springs provide a pressure which will yield upwardly at the instant the cutters become clogged or otherwise work under abnormal condition. The clamping bar bolt $4^b$, passes horizontally through the spring housing at a short distance above the shoe. A water passage $12^b$, is formed in the shoe and is disposed above the cutters. It is connected to any suitable water supply by the pipe $12^d$, and discharges cooling water under pressure downward upon the cutters through the water ports $12^e$, in a manner to effectively cool the cutters and wash the chips downward into the pan 11. From this pan the chips and water are discharged upon an inclined screened top of a water collecting receptacle $11^w$, so as to deposit the chips separately in a box $53^a$, Fig. 2.

Each stream of nuts is fed along its path into proper cutting engagement with the corresponding cutters by means of a power actuated feed pin roller 75, which rests upon the nuts and has a plurality of circular rows of radially projecting feed pins $75^a$, formed on its periphery. These feed pins are tapered and spaced so as to properly mesh with the racks formed by the equally spaced holes of each row of nuts when in close contact with each other as illustrated in Fig. 1. The fingers $16^a$, formed on the feed pin roller guard 16, rest upon the stream of nuts and project horizontally between the circular rows of pins so as to prevent the nuts from being lifted upward when passing from under the pin roller and toward the milling cutters. This guard is supported from the roller by means of the flanges $16^e$, which project upward and encircle the roller shaft in a manner to permit its ready removal when changing the feed pin sleeve $75^b$, for the purpose of milling different sized nuts.

The pin feed roller shaft 17, provides a journal for the feed roller, and is supported in a horizontal position by the swing frame 18, to which the shaft is rigidly fastened at its rear end by the nut $17^a$, and by the hubs $18^a$ and $18^b$, which are formed on the frame. The small bearing bracket $18^d$, supports the front end of the shaft 17, and is clamped to the swing frame 18, by the bolt $18^e$, in a manner to permit its ready removal and give access and freedom to the feed pin sleeve $75^b$ and the guard 16, when it is desired to change them for milling different sized nuts. When doing this the frame is lifted to clear the nuts by swinging it about its pivotal support formed on the shaft 19, which couples the swing frame to the base.

The swing frame also forms an effective guard which shields the operator from injurious contact with the feed pin roller and its driving spur gear 20, which is actuated by the driving spur pinion 21. This pinion is rotatively mounted upon the shaft 19; it is attached to the worm wheel 22 and to the belt conveyer pulley 23; all of which rotate upon the shaft 19, and are driven by the worm $22^a$, on the feed shaft $23^s$. The coned feed pulley 24 is fastened in usual manner to the feed clutch shaft 25, which is coupled to the worm feed shaft by means of the gears $25^a$. This feed gear train is coupled to the spindle 3, by the belt $24^a$ and the cone pulleys 24 and $24^b$.

The conveyer belt $23^a$, is driven by the pulley 23 and is positioned by the idler pulley $23^b$, and the tightener pulley $23^d$, so as to cause its upper surface to travel in a horizontal plane, toward the corresponding feed pin roller and milling cutters at a speed which is materially greater than the peripheral speed of the pin roller and the corresponding rate of cutting feed, or speed, of the stream of nuts which are propelled into the cutters by the pin roller. The swing frame and the pin roller are shown placed in their vertical position in Figs. 1, 4, 6 and 7, so the roller and pins clear the nuts when desiring to have access to the nut stream upon which the roller presses when feeding it through the cutters. The amount of this downward pressure is governed by the weight of the roller swing frame and the weight $18^w$, coupled thereto by a rope $18^u$ or other suitable means. This pressure is made only to slightly exceed an amount required to maintain the roller in its normal operating position while feeding the stream of nuts through the cutters, so that any greater resistance to the movement of the stream will cause the roller to lift and thereby call attention to any abnormal operation of the cutters before causing injury to the machine.

Nuts which are disposed upon the belt, manually, or automatically by a nut shifter to be described hereinafter, are carried by the belt at a speed of about three feet per minute, whereas the corresponding speed of the nut stream impelled by the pin roller is about one foot per minute; consequently, the deposited nuts quickly catch, and pack snugly against, the rear end of the nut stream so as to insure close contact and uniform spacing of the nut holes so they will match the pitch of the feed roller pins. The greater relative belt speed also causes slightly disarranged nuts to correct their position and alinement with respect to the stream by the crowding action of the facets forming the rear of the stream and the facets of the following nuts; thereby packing every nut snugly into its proper position in the stream. This stream of nuts is guided by the race side walls 26 and $26^a$. The space between these walls which forms the nut race is adjusted to suit different sized nuts by changing the side wall strips 26 and $26^a$, so as to cause them to come in sliding contact with the nut stream when the nuts are snugly packed against each other as illustrated in Fig. 1. The tightener pulley $23^d$, maintains uniform tension in the belt which is made of waterproof material. A bridge 52, is arranged between the conveyer belt $23^a$, and the race section for the purpose of carrying the nut stream from one to the other.

The nut race comprises three sections, two outer, right and left hand sections $26^R$, and $26^L$, which make an angle of 120° with the central section $26^C$, as illustrated in Fig. 1. They are disposed at right angles with the corresponding cutter spindles so as to properly position each gang of cutters in the corresponding nut race.

The nuts are manually positioned in proper order to form the nut stream shown in the chute 27, at the left. From the chute the stream of nuts slides downward upon the first conveyer belt $23^a$, and is carried thereby under the first pin feed roller. This roller impels the nuts through the first gang of cutters, which perform the first slotting operation, and along the race as already described. The junction of the left hand race section $26^L$, with the central section $26^C$, forms an angle of 120° on the line $26^f$. This requires that all the nuts must be automatically shifted at this point so as to cause them to be properly rearranged and positioned on the adjoining or second conveyer belt of the central race section for the purpose of again snugly packing them into the rearranged nut stream, which is impelled, by the second or central pin feed roller, through the central or second gang of cutters for the second slotting operation. The movement of the nuts from the first pin feed roller to the junction of the race sections is uniform and at an approximate speed of about one foot per minute.

As each diagonally disposed row of (three) nuts which forms part of the nut stream reaches a position directly over the junction line $26^f$, it is shifted in the direction of the nut stream motion in the central race section and upon the corresponding conveyer belt, by means of automatic shifter bar 28, which is actuated by the crank pin 29. This pin is revolved in a vertical plane by the spur gear $29^a$, and the pinion $30^a$, which are belt driven by the coned friction clutch pulley 30, that is mounted upon the pinion shaft $30^b$. A coned pulley 31, fastened to the shaft $31^a$, is coupled to the feed worm shaft $23^s$, by the gear $31^b$, and to the clutch pulley 30, by the belt $31^d$, so as to permit making any desired change in the rotative speed of the crank pin 29. A plurality of tapered and vertically arranged shifter pilot pins 32, project downward from the diagonally disposed front end 28$^f$, of the shifter bar and are disposed and actuated in a manner, to be described hereinafter, so as to drop into the holes of the diagonally disposed row of nuts at the instant they coincide with the diagonal junction line 26$^f$. The number of pilot pins correspond to the number of nut rows in the stream, which may comprise one or several rows; three having been chosen because they will require an operator to place about 30 nuts per minute when slotting five-eighths inch hexagon nuts. However, a greater or lesser number of rows may be provided for by merely changing the width of the race sections and the number of cutters in a gang. The pilot pins take one nut out of each row and because of their taper and pitch they hug it close against the adjoining nut from the adjacent row so as to prevent derangement thereof and also hold them in a diagonal line making an angle of 60 degrees with the race side walls, and in a position to match them accurately into the stream when carried forward by the conveyer belt. The inclined slot 28$^d$, which is formed at an angle to the vertical on the front vertical end of the shifter bar, forms a guide for the crank pin block 29$^b$, thereby giving a more nearly uniform speed to the forward motion of the pilot pins after they engage the nuts and up to the time the block reaches the upper adjustable end 28$^a$, of the slot. A further upward movement of the block quickly lifts the pilot pins from engagement with the nuts. This upward motion is quickened further by the effect of the shifter bar guide 28$^e$, formed at the rear end of the shifter bracket 33. This bracket is fastened to the corresponding base 1, by the bolts 33$^a$, and provides journal bearings for the pinion shaft 30$^b$ and the crank shaft 29$^s$. The pilot pins are removably fastened to the front diagonal end of the shifter bar by the bolts 32$^a$, to permit changing pins to suit a change in the size of nuts. The rotation of the crank is in the direction indicated by the dart, consequently the pilot pins, after being lifted from engagement with the nuts, are carried rearward until the trigger pin 34, formed on the shifter bar, is retarded in its rearward motion by the resistance of the trigger elbow lever 35. This resistance is caused by the nut trip pin 36, being retarded in its upward movement by a nut at the instant before the following nut hole registers with the trip pin. This retardation is transmitted to the elbow lever through the horizontally disposed nut trip arm 37, and the horizontal clutch trip lever 38, coupled thereto by the pin 38$^a$. The adjusting screw 35$^a$, formed on the lower end of the elbow lever governs, relatively, the position of its upper end by contact with the lower side of the lever 38. The nut trip pin 36, is adjustably clamped to the slotted end of the trip arm 37, by means of the clamp bolt 36$^a$ and the clamp 36$^b$, so as to permit the trip pin to be moved laterally with respect to the corresponding nut race when setting for a change in the size of nuts. A flange 36$^d$, is formed on the trip pin and engages the catch 39$^a$, formed on the adjustable catch member 39, at the instant a nut hole registers with the trip pin and permits a final upward movement thereof for a sufficient distance to permit the spring 40, to force the flange into the catch notch 39$^a$. This final upward movement permits the force from the slipping of the friction clutch 41, which is transmitted to the crank pin 29, to throw the upper end of the elbow lever 35, into its extreme rear position and thereby free the movement of the crank pin until the pilot pins are positioned on the pilot pin supporting plate 48, near the junction line 26$^f$. When the nut pilot pins arrive at this, their starting position, the adjustable crank stop pin 42, engages the inclined surface, or cam 43$^a$, formed on the end of the brake trip lever 43 swings the lever about the pin 43$^b$ against the resistance of the spring 43$^s$, sufficiently to disengage the catches 43$^h$ and 44$^h$, and thereby disengages the brake lever 44, also the friction clutch lever 44$^b$, formed integral with the brake lever. This action causes the brake lever 44 to swing on the pin 45 and move toward the coned pulley 41, because of the unbalanced weight in 44$^b$, and applies the brake pad 44$^d$, to the pinion shaft friction disk 30$^e$, which instantly stops the rotation of the crank pin and the movement of the pilot pins until the nut trip pin 36, is disengaged from the catch 39$^a$, by the motion of the nut stream which moves laterally of lever 37 (Fig. 18). This disengagement causes the weight 37$^b$, to pull downward and swing the levers 44, 44$^b$ and 38, about the pin 45, and thereby release the brake 44$^d$, apply the friction clutch 41, and rotate the crank so as to again shift three nuts from the junction line 26$^f$, forward upon the belt in the manner already described.

The pin 45, is supported in a horizontal position by the bracket 33. The lug 38$^e$, formed on the short right hand end of the lever 38, comes into lifting contact with the lever 44$^b$, when impelled upward by the weight 37$^b$, instantly after the nut tripper 36, is freed from the notch 39$^a$, as already described. The lug 38$^e$, recedes from contact with the lever 44$^b$, during the time the lever 43 by engagement of the catch 43$^h$ with the catch 44$^h$, locks the friction clutch in driving position and consequently, by means of the shifter bar 28 and the pin 34, the clutch is moving the elbow lever 35, into its rear position and thereby lifting the levers 37, 38 and the weight 37$^b$, until the trip pin flange 36$^d$, engages the notch 39$^a$. The lug again comes into contact with the lever 44$^b$, at the instant the stop pin 42, trips the lever 43 and thereby drops the lever 44$^b$, toward the lug 38$^e$. The levers 44 and 44$^b$, are integral.

The friction clutch spring 50, is interposed between the adjustment 44$^s$, formed at the top end of the lever 44$^b$, so as to provide a predetermined adjustable amount of pressure and corresponding friction clutch torque which will be sufficient to lift the weight 37$^b$, levers 37, 38 and the nut trip pin 36, into their upper positions, after having rotated the crank pin 29 and thereby shifted nuts from one stream to the other. This torque not being great enough to injure or cause abnormal operation of the automatic nut shifter, of which the clutch forms a part.

The position of the crank stop pin 42, can be changed to either the hole 42$^a$ or 42$^h$ and thereby cause the crank 29 and the pilot pins 32, to stop at any desired position and then wait until a movement of the nut trip pin 36, again starts the rotation by applying the friction clutch as already described. The nut stream after passing through the second or central gang of cutters continues until a second automatic nut shifter, changes its course and transfers the stream to the right hand race 26$^R$ in a manner already described.

The diagonal edge of the pilot pin supporting plate 48, is disposed parallel with the junction line 26$^f$, and at a greater or lesser distance therefrom to suit different sized nuts, and so as to permit the pilot pins 32, which rest thereon, to readily drop into the nut holes when they reach a central position directly over the junction line 26$^f$. A cover plate 48$^a$, extends rearward from the pilot pin supporting plate 48, and over the nuts which trip the trip pin 36, so as to prevent the nuts from being displaced, or lifted, by the upward thrust of the trip pin. The bottom nut trip plate 49, is disposed laterally with respect to the nut race, to accommodate an adjustment of the trip pin 36, along the lever 37, to suit a change in size of nuts.

At the discharge end of each slotted race section or removable top 10, a grated race section 50$^a$, is disposed so as to form a bridge to carry the nut stream to the automatic shifter and to provide a drip adapted to separate the cooling water and stray chips from the nut stream. One end of the grated race section is supported by the milling table 9, and the other by the automatic shifter.

An air blast is directed downward upon and through the nut stream and grating immediately after the slotting operation, by the nozzles 51, so as to blow all moisture and chip remnants down through the last grated race section at the right end of the machine and before the nuts drop into the tote box 53, thereby perfectly cleaning and drying the nuts.

In the practice of my invention, the slotting cutters are made from 7 to 8 inches in diameter and are rotated about 100 turns per minute with 12 inches as the corresponding rate of feed. This for example when slotting $\frac{7}{8}$ in. hexagon nuts, gives a capacity rate of 25 nuts per minute, when feeding three rows of nuts in the stream, and which the operator places in the chute 27, in the order as illustrated. From the chute the stream of nuts at a speed of about three feet per minute is carried by the belt conveyer toward the first pin feed roller and packs them snugly in the stream before being fed by the roller along the left hand race sections toward and through the first gang of cutters which form the slots shown by dotted lines in Fig. 1. After leaving the cutters the stream is impelled over the grated race section, to be cleared from cooling liquid and chips, and is delivered to the first automatic shifter.

When adjusted, the automatic shifter nut trip pin 36, unlatches from the notch 39$^a$, at the instant the first or leading diagonal row of three nuts in the stream comes centrally over the diagonal junction line 26$^f$, thereby causes the fall of the weight 37$^b$, to lift the lug 38$^e$, and throw the friction clutch 41, into operating position, and also locks the clutch in this position by engaging the upper end of the lever 44, with the catch on the lever 43 by engagement of the catch 43$^h$ with the catch 44$^h$. The three tapered pilot pins 32, are thereby moved, from their starting position upon and near the diagonal edge of the supporting plate 48, into engagement with the holes of the first diagonal row of three nuts. Further movement of the pilot pins, toward the right and diagonally from the stream, rearranges the nuts upon the second or central conveyer belt so as to present other wrench facets toward the next or central gang of cutters in a manner which is the equivalent of rotating all the nuts through an angle of 60°. The slope of the crank pin slot 28$^d$, causes the pilot pins to quickly lift free from the nuts and move rearward, toward the left, until the pin 34, is retarded by a resistance to upward movement of the nut trip pin 36, providing it does not happen to be timed just right, with the nut stream movement, to register with a nut hole; in this case the shifter mechanism is held stationary by the trip pin against the predetermined friction clutch torque, measured by the spring 50, until the nut trip pin enters the corresponding nut hole and is lifted, with the weight and levers, into its upper position, which permits further rotation of the crank until the stop pin 42, strikes the lever 43, thereby releases the clutch and applies the brake at the instant the pilot pins reach their starting position. If the rotative speed of the crank is timed, by the coned pulley, to correspond with the nut stream motion, there is no hesitation in the rotation of the crank pin 29, which, when slotting ⅝″ nuts is about nine revolutions per minute. After leaving the first shifter the nut stream is fed through the central and last gangs of slotting cutters in the manner already described, and the nuts are finally delivered in the tote box 53, after being cleaned and dried, by the air blast 51, while passing over the third or last grated race section. The high rate of slotting capacity is obtained by the continuous cutting action at a moderate rate of cutting and speed and feed, wherein there are no delays or interruptions which are usual with automatic machines wherein each nut is chucked separately or in groups.

By abutting the facet of each nut tightly against that of the following while being fed through the slotters, the cutting teeth slot each pair of adjoining nut walls as if they were integral and, therefore, do not form chip burs on the facets at the bottom of the slot, as is usual in machines wherein the cutters complete each slot in a nut before starting another. Burs that are formed on one side in the nut bores are removed by the reaming action of the advanced cutting edge of a threading tap, without extra manipulation or extra cost, by a tapping operation.

I claim as my invention and desire to secure by Letters Patent:

1. The combination in a nut slotting machine of a plurality of slotting cutter spindles; slotting cutters driven thereby; a plurality of nut race sections adapted to guide a stream of one or more rows of nuts into proper cutting engagement with the corresponding cutters so as to form slots therein; and means for transferring the nuts from one race section to the following section for the purpose of re-arranging the nuts so as to feed them properly past the following cutters and form slots therein at a predetermined angle to the slots cut by the preceding cutters.

2. The combination in a nut slotting machine; of a nut race adapted to guide a stream of one or more rows of nuts and comprising a plurality of sections disposed at a predetermined angle to each other; means for impelling the stream along the race sections; means for transferring the nuts from one race section to the following section; milling cutters arranged to protrude into the race sections so as to come into proper cutting engagement with the nuts and form slots therein; and means for actuating the milling cutters.

3. The combination in a hexagon nut slotting machine; of a first, second and third nut stream guiding race sections disposed at an angle of 120° between the adjoining sections, and adapted to guide one or more rows of nuts; three rotary slotting cutter spindles disposed at an angle of 60° with each other and each disposed normally to its corresponding race section; one or more slotting cutters rotated by the spindles and adapted to protrude into each race section so as to come into proper cutting engagement with the nuts and form slots therein; means for disposing the nut stream in the second and third race sections so that the cutters slot the nuts at an angle of 60° with the slots formed by the preceding cutters; and means for impelling the nut stream along the race sections and past the cutters.

4. The combination in a hexagon nut slotting machine; of a first, second and third nut stream guiding race sections disposed at an angle of 120° between the adjoining sections, and adapted to guide one or more rows of nuts; three rotary slotting cutter spindles disposed at an angle of 60° between the adjoining spindles and each disposed normally to its corresponding race section; one or more slotting cutters rotated by the spindles and adapted to protrude into each race section so as to come into proper cutting engagement with the nuts and form slots therein; and automatic means adapted to rearrange and change the flow direction of the nut stream when passing from either the first or second race section to the following section so that the cutters slot the nuts at an angle of 60° with the slots formed by the preceding cutters.

5. The combination in a nut slotting machine of a nut race adapted to guide a stream of one or more rows of nuts; power actuated slotting cutters; means for feeding the stream along the race and past the slotting cutters which are arranged to protrude into the race sections so as to come into proper cutting engagement with the nuts and form slots therein; and means for impelling the nuts along the race at a greater speed than that of the feeding means for the purpose of properly and snugly packing the nuts into the stream before coming into engagement with said feeding means.

6. The combination in a nut slotting machine; of a nut race adapted to guide a stream of one or more rows of nuts; power actuated slotting cutters; means for feeding the stream along the race and past the slotting cutters which are arranged to protrude into the race sections so as to come into proper cutting engagement with the nuts and form slots therein; means for impelling the nuts along the race at a greater speed than that of the feeding means for the purpose of properly and snugly packing the nuts into the stream before coming into engagement with said feeding means, and means for disposing nuts upon said impelling means.

7. The combination in a nut slotting machine; of a nut race having an adjustable section formed therein and adapted to guide a stream of one or more rows of nuts; power actuated slotting cutters disposed beneath the race; means for feeding the stream along the race and past the slotting cutters which are arranged to protrude into the race and into proper cutting engagement with the nuts to form slots therein; a shoe disposed over the cutters and upon the stream of nuts, and means for positioning the adjustable race section to determine the depth of the nut slots and to compensate for wear of the cutters.

8. The combination in a nut slotting machine; of a nut race having an adjustable section formed therein and adapted to guide a stream of one or more rows of nuts; power actuated slotting cutters disposed beneath the race; means for feeding the stream along the race and past the slotting cutters which are arranged to protrude into the race and into proper cutting engagement with the nuts to form slots therein; a shoe disposed over the cutters and upon the stream of nuts, means for positioning the adjustable race section to determine the depth of the nut slots and to compensate for wear of the cutters and means for fastening the shoe to said adjustable race section.

9. The combination in a hexagon nut slotting machine, of two outer and one central nut stream guiding race sections, the outer sections being disposed at an angle of 120° with the central section; two outer and one central horizontal cutter spindle disposed at an angle of 60° with each other and normally to the corresponding race section with their axial lines meeting at a point back of the central section and between the outer sections; one or more slotting cutters fastened to each spindle so as to protrude into the corresponding race section and in proper cutting engagement with the nuts to form slots therein; means for feeding the nut stream past the cutters; and power actuated driving gears disposed between the outer and central race sections and coupled to said spindles for the purpose of actuating the slotting cutters.

10. The combination in a hexagon nut slotting machine, of two outer and one central nut stream guiding race sections, said central section being disposed at an angle of 120° with the outer sections, and which are adapted to guide one or more rows of nuts; two outer, and one central cutter spindle horizontally disposed and the latter at an angle of 60° with the outer spindles, and each normal to the corresponding race section, with their axial lines meeting in a common intersecting point; one or more slotting cutters fastened to each spindle so as to protrude into the corresponding race section and in proper cutting engagement with the nuts to form slots therein; means for feeding the nut stream past the cutters; two outer and one central bevel spindle gear fastened to their corresponding spindles at a point between the cutters and the intersecting point; bevel driving pinions interposed between said spindle gears and fastened on a pair of intermediate shafts making an angle of 60° with each other and 30° with the central spindle; an intermediate bevel gear fastened on each intermediate shaft; a centrally disposed driving shaft and pinion arranged in axial alinement with the central spindle and coupled to the pair of intermediate bevel gears for the purpose of driving the cutters; and journal bearings adapted to support the shafts and spindles.

11. In a machine for slotting nuts or other objects, the combination of a nut race adapted to guide a stream of one or more rows of nuts; power actuated slotting cutters arranged to protrude into the race and into proper cutting engagement with the nuts to form slots therein; a pivotally supported and power actuated feed roller; and pins projecting outwardly therefrom and arranged to match the pitch of the holes in the nut stream for the purpose of engaging and feeding the stream past the slotting cutters.

12. In a machine for slotting nuts or other objects, the combination of a nut race adapted to guide a stream of one or more rows of nuts; power actuated slotting cutters arranged to protrude into the race and into proper cutting engagement with the nuts to form slots therein; a pivotally supported and power actuated feed roller; pins projecting outwardly therefrom and arranged to match the pitch of the holes in the nut stream for the purpose of engaging and feeding the stream past the slotting cutters and a shoe disposed over the cutters and upon the nut stream for the purpose of holding the stream in proper cutting relation with the slotting cutters.

13. In a machine for slotting nuts or other objects, the combination of a nut race adapted to guide a stream of one or more rows of nuts; power actuated slotting cutters arranged to protrude into the race and into proper cutting engagement with the nuts to form slots therein; a pivotally supported and power actuated feed roller; pins projecting outwardly therefrom and arranged to match the pitch of the holes in the nut stream for the purpose of engaging and feeding the stream past the slotting cutters, and a guard disposed adjacent to said pins for the purpose of preventing nuts from being lifted from the stream by the pins.

14. In a machine for slotting nuts or other objects, the combination of a nut race adapted to guide a stream of one or more rows of nuts; power actuated slotting cutters arranged to protrude into the race and into proper cutting engagement with the nuts to form slots therein; a pivotally supported and power actuated feed roller; pins projecting outwardly therefrom and arranged to match the pitch of the holes in the nut stream for the purpose of engaging and feeding the stream past the slotting cutters, and a swing frame pivoted on the machine and adapted to pivotally support the feed roller while in engagement with, and when free from, the nut stream.

15. In a machine for slotting nuts or other objects, the combination of a nut race adapted to guide a stream of one or more rows of nuts; power actuated slotting cutters arranged to protrude into the race and into proper cutting engagement with the nuts to form slots therein; a pivotally supported and power actuated feed roller; pins projecting outwardly therefrom and arranged to match the pitch of the holes in the nut stream for the purpose of engaging and feeding the stream past the slotting cutters, a swing frame pivoted on the machine and adapted to pivotally support the feed roller while in engagement with, and when free from, the nut stream, and means for increasing the pressure of the roller upon the nuts sufficiently to feed the stream through the cutters against a maximum normal resistance.

16. In a machine for slotting nuts or other objects, the combination of a nut race section adapted to guide a stream of one or more rows of nuts; power actuated slotting cutters arranged to protrude into the race section and into proper cutting engagement with the nuts to form slots therein; means for feeding the nut stream along the race and past the cutters at a predetermined feeding rate; a conveying means having a greater speed than said feeding rate and arranged to pack nuts snugly into the stream before engaging the feeding means; and a bridge adapted to carry the nuts across a space between said impelling means and the race section.

17. In a machine for slotting nuts or other objects, the combination of a nut race adapted to guide a stream of one or more rows of nuts; power actuated slotting cutters arranged to protrude into the race and into proper cutting engagement with the nuts to form slots therein; a pivotally supported and power actuated feed roller; pins projecting outwardly therefrom and arranged to match the pitch of the holes in the nut stream for the purpose of engaging and feeding the stream past the slotting cutters, a shoe disposed over the cutters and upon the nut stream for the purpose of holding the stream in proper cutting relation with the slotting cutters, and springs so disposed and adapted to press the shoe toward the nut stream with sufficient stress to resist the thrust coming from the slotting cutters, and to lift from excessive thrust when the cutters are operating abnormally.

18. In a machine for slotting nuts and similar articles, the combination of a plurality of nut race sections adapted to guide a stream of one or more rows of nuts; power actuated slotting cutters arranged to protrude into an adjustable race section and into proper cutting engagement with the nuts to form slots therein, means for adjusting one of said sections toward and from the cutters for the purpose of adjusting the depth of the slots cut; a housing formed in the adjustable section adapted to inclose the cutters; and means for feeding the stream along the race section and past the slotting cutters.

19. In a machine for slotting nuts and similar articles, the combination of a plurality of nut race sections adapted to guide a stream of one or more row of nuts; power actuated slotting cutters arranged to protrude into an adjustable race section and into proper cutting engagement with the nuts to form slots therein, means for adjusting one of said sections relatively to the cutters for the purpose of adjusting the depth of the slots cut; a housing formed in the adjustable section adapted to inclose the cutters; means for feeding the stream along the race section and past the slotting cutters, and a removable slotted member forming the bottom side of the adjustable race section through which the cutters protrude into the race, and which is adapted to support, and aid in guiding, the nuts through the cutters.

20. The combination in a nut slotting machine; of a nut race adapted to guide a stream of one or more rows of nuts and comprising a plurality of sections disposed at a predetermined angle to each other, the width of said nut race sections being variable to adapt the machine to different sized nuts; means for impelling the stream along the race sections; milling cutters arranged to protrude into the race sections so as to come into proper cutting engagement with the nuts and form slots therein; and means for actuating the milling cutters.

21. In a machine for slotting nuts or similar articles, the combination of a pair of nut race sections disposed end to end with each other and adapted to guide a stream of one or more rows of nuts; power actuated slotting cutters arranged to protrude into said sections and into proper cutting engagement with the nuts to form slots therein; means for feeding the nut stream along the race sections and past the cutters; a power actuated automatic reciprocating nut shifting member disposed at the junction line of the race sections; and pilot pins carried thereby and adapted to reciprocate across said junction line, above the nut stream and to repeatedly drop into engagement with the holes of a predetermined number of nuts as they are fed up to the line so as to properly start and rearrange them in the adjoining race before they are fed past the corresponding cutters.

22. In a machine for slotting nuts or similar articles, the combination of a pair of nut race sections disposed end to end with each other and adapted to guide a stream of one or more rows of nuts; power actuated slotting cutters arranged to protrude into said sections and into proper cutting engagement with the nuts to form slots therein; means for feeding the nut stream along the race sections and past the cutters; a power actuated automatic reciprocating nut shifting member disposed at the junction line of the race sections; pilot pins carried thereby and adapted to reciprocate across said junction line, above the nut stream and to repeatedly drop into engagement with the holes of a predetermined number of nuts as they are fed across the line so as to properly start and rearrange them in the adjoining race before they are fed past the corresponding cutters; a crank pin coupled to the shifting member, a friction clutch for driving the crank; a nut trip adapted to be tripped by engagement with the moving nut stream; means for coupling the nut trip to the clutch so as to start the reciprocation of the shifting member; and means for automatically stopping said member.

23. The combination in a nut slotting machine, of a nut race comprising a plurality of sections adapted to guide a stream of one or more rows of nuts; power actuated slotting cutters arranged to protrude into the race and into proper cutting engagement with the nuts to form slots therein; power actuated means for feeding the nuts along the race and past the cutters; and a grating formed in a race section so as to drip cooling liquid and chips from the nuts.

24. The combination in a nut slotting machine, of a nut race comprising a plurality of sections adapted to guide a stream of one or more rows of nuts; power actuated slotting cutters arranged to protrude into the race and into proper cutting engagement with the nuts to form slots therein; power actuated means for feeding the nuts along the race and past the cutters; a grating formed in a race section so as to drip cooling liquid and chips from the nuts and means for jetting a blast downwardly through said nut stream and the grating for the purpose of cleansing the nuts.

25. The combination in a nut slotting machine, of a nut race adapted to guide a stream of one or more nut rows; power actuated slotting cutters arranged to protrude into the race and into proper cutting engagement with the nuts to form slots therein; means for feeding the stream of nuts along the race and past the cutters, comprising a pin feed roller adapted to engage the nut stream; a gear attached thereto; a shaft; a swing frame pivotally mounted thereon and adapted to support the feed roller and gear; a conveyer belt pulley, and a power actuated pinion coupled to the gear and fastened to the conveyer pulley so as to rotate the roller at a slower traversing speed than the pulley.

26. In a machine for slotting nuts and similar articles, the combination of a nut race adapted to guide a stream of one or more rows of nuts; power actuated slotting cutters arranged to protrude into the race and into cutting engagement with the nuts to form slots therein; a pivotally supported and power actuated feed roller; a detachable sleeve attached to the roller and driven thereby; pins formed on and projecting outwardly from the sleeve and arranged to match the pitch of the holes in the nut stream for the purpose of engaging and feeding the stream past the cutters, and means for pivotally supporting the roller.

CHARLES L. HEISLER.

Witnesses:
 CHARLES H. PARSONS,
 ELIZABETH R. FINEGAN.